United States Patent
Lin et al.

(10) Patent No.: US 8,349,028 B2
(45) Date of Patent: Jan. 8, 2013

(54) REACTIVE PRINTING DYE AND ITS AQUEOUS COMPOSITION APPLICATION

(75) Inventors: Wen-Chin Lin, Taoyuan Hsien (TW); Chien-Wen Lee, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 12/591,236

(22) Filed: Nov. 13, 2009

(65) Prior Publication Data

US 2011/0041265 A1 Feb. 24, 2011

(30) Foreign Application Priority Data

Aug. 21, 2009 (TW) .............................. 98128185 A

(51) Int. Cl.
 *C09B 62/04* (2006.01)
(52) U.S. Cl. .............. 8/543; 8/602; 8/636; 8/639; 8/641; 8/662; 8/667; 8/685; 8/688; 8/918; 8/588
(58) Field of Classification Search .............. 8/543, 549, 8/587, 550, 641, 680, 682, 687, 688, 588, 8/602, 636, 639, 662, 667, 685, 918
See application file for complete search history.

(56) References Cited

U.S. PATENT DOCUMENTS

| 4,780,104 | A |   | 10/1988 | Yamauchi et al. |
| 4,842,614 | A |   | 6/1989 | Yamauchi et al. |
| 5,431,722 | A | * | 7/1995 | Yamashita et al. ......... 106/31.43 |
| 6,015,454 | A |   | 1/2000 | Lacroix et al. |
| 6,153,263 | A | * | 11/2000 | Haruta et al. ................. 427/261 |
| 6,780,229 | B2 |   | 8/2004 | Hopper et al. |
| 2003/0172840 | A1 | * | 9/2003 | Blank et al. ................ 106/31.27 |
| 2009/0211488 | A1 |   | 8/2009 | Lee et al. |

FOREIGN PATENT DOCUMENTS

EP 0 472 968 A2 3/1992

\* cited by examiner

*Primary Examiner* — Lorna M Douyon
*Assistant Examiner* — Amina Khan
(74) *Attorney, Agent, or Firm* — Bacon & Thomas, PLLC

(57) ABSTRACT

The present invention relates to a reactive printing dye composition, which includes: (a) at least one reactive dye; (b) an organic buffer; and (c) a mirabilite or a dispersant. The reactive printing dye composition of the present invention is capable for being used in the fabric-dyeing, for example, dyeing of cotton, hemp, silk, rayon, wool, blending, etc. The reactive printing dye composition of the present invention is advantageous in high pH value stability, high storage stability, and reduced degradation in dyeing strength. In addition, the present invention further provides an aqueous reactive printing dye composition.

2 Claims, No Drawings

REACTIVE PRINTING DYE AND ITS AQUEOUS COMPOSITION APPLICATION

BACKGROUND OF THE INVENTION

1. Field of the Invention

The present invention relates to reactive dye composition and, more particularly, to a reactive printing dye composition and/or an aqueous reactive printing dye composition, which is suitable for printing of cellulose fibers.

2. Description of Related Art

U.S. Pat. No. 6,780,229 disclosed a dye composition in which an organic buffer is used for keeping the pH value in a range of from 4 to 8. A dye composition, including at least one reactive dye and 1,2-propylene glycol or N-methyl-2-pyrrolidone, was disclosed in U.S. Pat. No. 6,015,454. The dye composition disclosed by U.S. Pat. No. 6,015,454 exhibits improved color strength and fixation, but poor storage stability. In addition, US publication No. 2003/0172840 disclosed a dye composition, which includes a reactive dye, sulfolane and a buffer system and has improved storage stability. Unfortunately, its chlorine bleaching fastness, build up (strength) and solubility are not satisfying.

Thereby, for those skilled in the art, it is an important objective to provide a reactive printing dye composition having excellent properties, such as high pH value stability, low degradation in dyeing strength, high build up (strength) and high dye concentration.

SUMMARY OF THE INVENTION

The object of the present invention is to provide a reactive printing dye composition and/or an aqueous reactive printing dye composition, which is capable of being used in printing or digital spray printing of cellulose fibers or other fiber blend fabrics, and is advantageous in high pH value stability, enhanced storage stability, and reduced degradation in dyeing strength.

The present invention provides a reactive printing dye composition, which includes:

(a) at least one reactive dye in an amount of 45 to 99.85 parts by weight;

(b) an organic buffer in an amount of 0.05 to 10 parts by weight; and (c) a mirabilite (sodium sulfate) or a dispersant in an amount of 0.1 to 50 parts by weight.

Further, the present invention provides an aqueous reactive printing dye composition, which includes:

(a) at least one reactive dye in an amount of 1 to 50 parts by weight;

(b) an organic buffer in an amount of 0.05 to 10 parts by weight; and (c) water in an amount of 40 to 98.95 parts by weight.

In the reactive printing dye composition and/or the aqueous reactive printing dye composition according to the present invention, the possibility of hydrolysis in reactive groups of the reactive dye can be reduced so as to resolve the problem of dyeing strength degradation, such that the advantages, such as excellent color strength, good storage stability, inhibited precipitation and improved printing stability, can be provided.

The printed cloth prepared by the reactive printing dye composition and/or the aqueous reactive printing dye composition according to the present invention exhibits excellent properties.

For convenience in printing, the reactive printing dye composition of the present invention may be prepared in an aqueous form.

In the reactive printing dye composition and/or the aqueous reactive printing dye composition according to the present invention, the above-mentioned component (a), the reactive dye, may be water-soluble and has a monochlorotriazinyl derivative moiety. Its exemplary cases are shown as following Formulas (I-1) to (I-16),

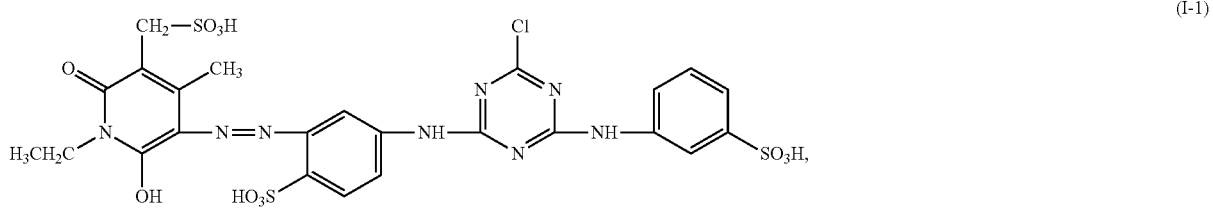
(I-1)

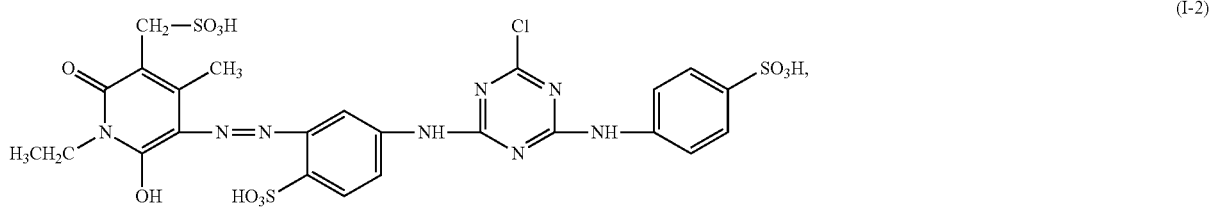
(I-2)

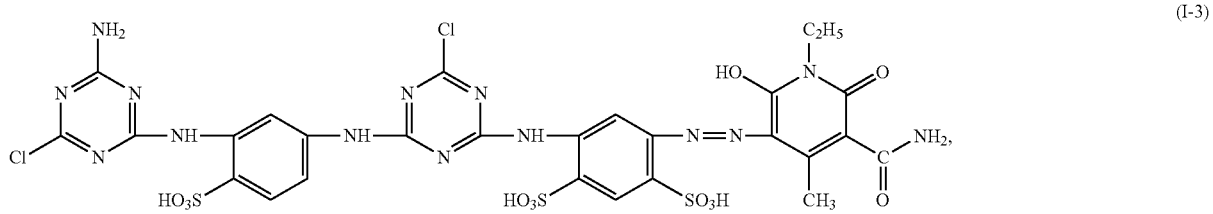
(I-3)

-continued
(I-4)
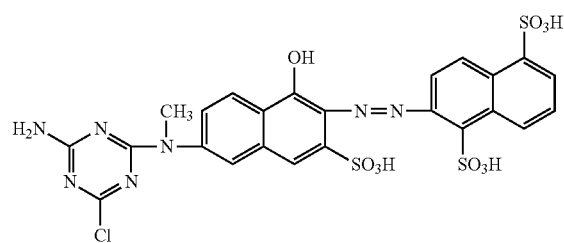
(I-5)
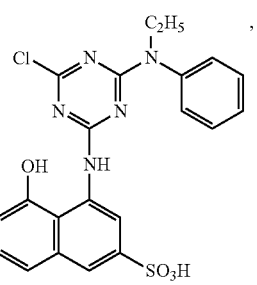
(I-6)
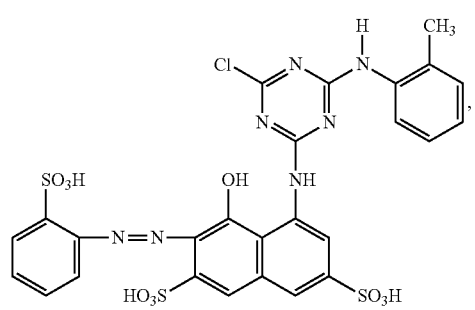
(I-7)
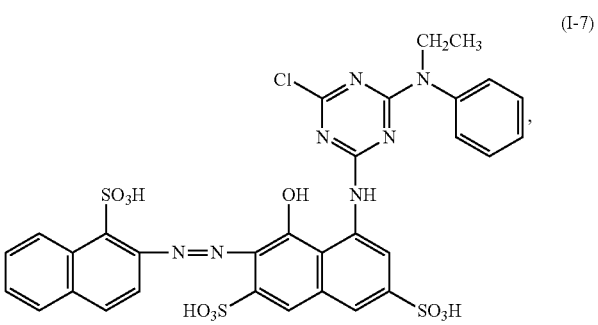
(I-8)
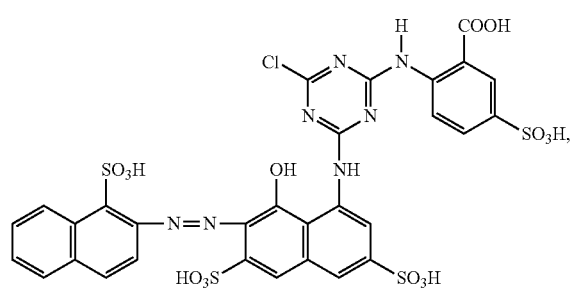
(I-9)
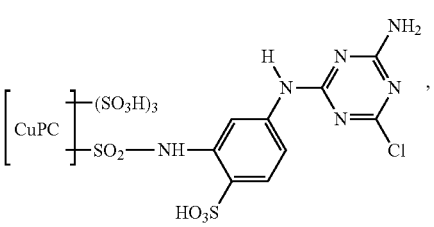
(I-10)
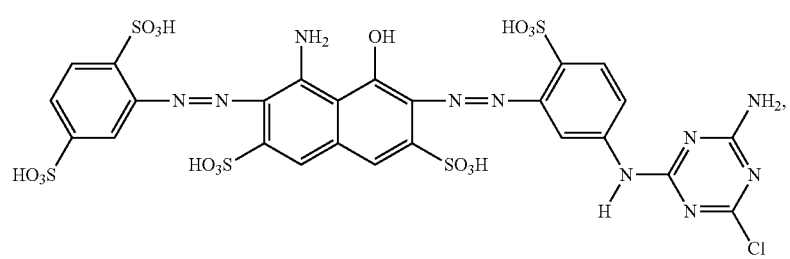
(I-11)
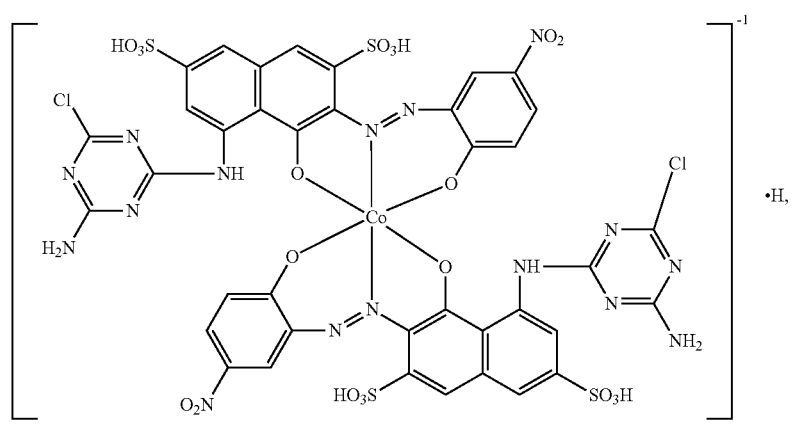

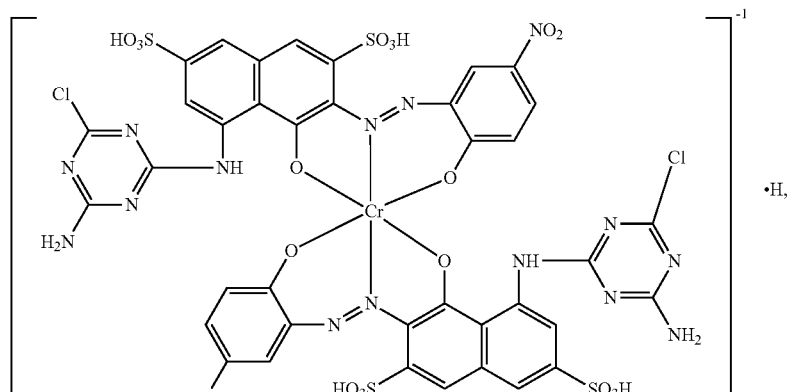
(I-12)

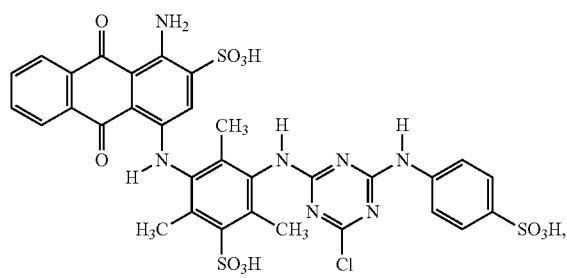
(I-13)

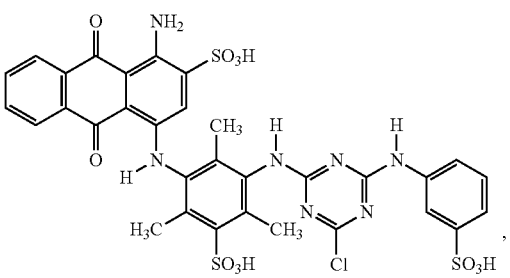
(I-14)

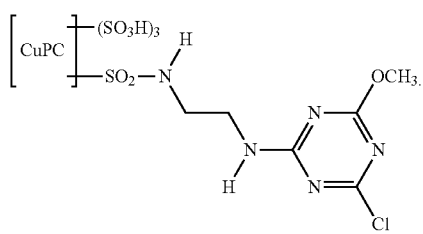
(I-15)

Such reactive dyes may be selected from the Color Index, for example, C.I. Reactive Red 3:1, C.I. Reactive Red 31, C.I. Reactive Red 33, C.I. Reactive Red 24, C.I. Reactive Red 45, C.I. Reactive Red 218, C.I. Reactive Violet 5, C.I. Reactive Yellow 2, C.I. Reactive Yellow 18, C.I. Reactive Yellow 33, C.I. Reactive Yellow 85, C.I. Reactive Yellow 95, C.I. Reactive Blue 15, C.I. Reactive Blue 5, C.I. Reactive Blue 49, C.I. Reactive Blue 71, C.I. Reactive Blue 176, C.I. Reactive Orange 5, C.I. Reactive Orange 12, C.I. Reactive Orange 13, C.I. Reactive Orange 99, C.I. Reactive Green 19, C.I. Reactive Brown 17, C.I. Reactive Black 8 or C.I. Reactive Black 5.

The reactive dyes in the reactive printing dye composition and/or the aqueous reactive printing dye composition according to the present invention may be used individually or mixed with the above-mentioned reactive dyes or the salts of an alkali metal or ammonium thereof. If the composition is aqueous, the amount of the added salts should be low. In other words, based on the weight of the reactive dye, preferably, the salt content is less than 0.5 wt %. The salts produced during processes and diluents additionally added can be removed by, for example, membrane separation, ultra-filtration, reverse osmosis, or dialysis.

In the reactive printing dye composition and/or the aqueous reactive printing dye composition according to the present invention, the example of the component (b), the organic buffer, is N,N-bis(2-Hydroxyethyl)-2-aminoethanesulfonic acid (BES), and its structure is shown as the formula (II-1),

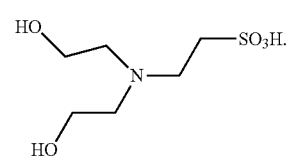
(II-1)

In the reactive printing dye composition and/or the aqueous reactive printing dye composition according to the present invention, the dispersant may be Demol RN, Demol SS, Levenol V, or Levenol TD, but is not limited thereto.

In the reactive printing dye composition according to the present invention, based on the total weight of the dye composition, the amount of the reactive dye may range from 45 wt % to 99.85 wt %, the amount of the organic buffer may range from 0.05 wt % to 10 wt %, and the amount of the mirabilite or the dispersant may range from 0.1 wt % to 50 wt %. Preferably, the amount of the reactive dye ranges from 45 wt % to 99.8 wt %, the amount of the organic buffer ranges from 0.1 wt % to 5 wt %, and the amount of the mirabilite or the dispersant ranges from 0.1 wt % to 50 wt %. More preferably, the amount of the reactive dye ranges from 47 wt % to 99.7 wt %, the amount of the organic buffer ranges from 0.2 wt % to 3 wt %, and the amount of the mirabilite or the dispersant ranges from 0.1 wt % to 50 wt %. Most preferably, the amount of the reactive dye ranges from 47 wt % to 90 wt %, the amount of the organic buffer ranges from 0.2 wt % to 3 wt %, and the amount of the mirabilite or the dispersant ranges from 9.8 wt % to 50 wt %. However, the amounts of the components are not limited thereto.

In the aqueous reactive printing dye composition according to the present invention, based on the total weight of the aqueous dye composition, the amount of the reactive dye may range from 1 wt % to 50 wt %, the amount of the organic buffer may range from 0.05 wt % to 10 wt %, and the amount of water may range from 40 wt % to 98.95 wt %. Preferably, the amount of the reactive dye ranges from 3 wt % to 45 wt %, the amount of the organic buffer ranges from 0.1 wt % to 8 wt %, and the amount of water ranges from 47 wt % to 96.9 wt %. More preferably, the amount of the reactive dye ranges from 3 wt % to 45 wt %, the amount of the organic buffer ranges from 0.2 wt % to 8 wt %, and the amount of water ranges from 47 wt % to 96.8 wt %. Most preferably, the amount of the reactive dye ranges from 5 wt % to 40 wt %, the amount of the organic buffer ranges from 0.2 wt % to 8 wt %, and the amount of water ranges from 52 wt % to 94.8 wt %. However, the amounts of the components are not limited thereto.

In the reactive printing dye composition and/or the aqueous reactive printing dye composition according to the present invention, all of the above-shown compounds are expressed as free acid. Practically, the compounds used in the reactive printing dye composition and/or the aqueous reactive printing dye composition according to the present invention may be metal salts or ammonium salts, and preferably are alkaline metal salts or ammonium salts. The dye composition of the present invention can be prepared by mixing the above components in water according to general procedures.

The reactive printing dye composition and/or the aqueous reactive printing dye composition according to the present invention can be applied to printing on material containing cellulose fibers such as cotton, hemp, cellulose, synthetic fibers, and materials containing hydroxyl fibers.

In the reactive printing dye composition and/or the aqueous reactive printing dye composition according to the present invention, the possibility of hydrolysis in reactive groups of the reactive dye can be reduced so as to resolve the problem of dyeing strength degradation, such that the advantages, such as excellent color strength, good storage stability, inhibited precipitation and improved printing stability, can be provided.

The printed cloth prepared by the reactive printing dye composition and/or the aqueous reactive printing dye composition according to the present invention exhibits excellent properties, such as strong fiber-dye bond stability, clear features (high resolution), high miscibility and good color strength, and good fastness to light and wet, for example, washing, water, brine, re-dyeing, moisture, chlorinating, rubbing, hot pressing and pleating.

BRIEF DESCRIPTION OF THE DRAWINGS

None

DETAILED DESCRIPTION OF THE PREFERRED EMBODIMENT

The following examples are used to illustrate the present invention, and many other possible modifications and variations can be made without departing from the spirit of the present invention according to various concepts and applications. The following examples are exemplified for a more concrete description, and the scope of the present invention should not be limited thereto. Without specific explanations, the unit of the parts and percentages used in the examples is calculated by weight, and the temperature is represented by Celsius degrees (° C.). The relation between the parts by weight and the parts by volume is just like the relation between kilogram and liter.

Example 1

50 parts of Compound (I-1), 50 parts of Compound (I-2) and 300 parts of water are mixed thoroughly, followed by adjusting the pH value to a range of from 5.5 to 8.5. Through reverse osmosis, the salts are controlled to be less than 0.5 wt %. Subsequently, 2 parts of Compound (II-1) are added thereto, followed by stirring and adjusting the pH value to a range of from 6.0 to 8.5. Finally, the solution is spray dried so as to obtain the reactive printing dye composition of the present embodiment.

Example 2

100 parts of Compound (I-3) and 300 parts of water are mixed thoroughly, followed by adjusting the pH value to a range of from 5.5 to 8.5. After purification, 5 parts of Compound (II-1) and 30 parts of mirabilite are added thereto, followed by stirring and adjusting the pH value to a range of from 6.0 to 8.5. Finally, the solution is spray dried so as to obtain the reactive printing dye composition of the present embodiment.

Example 3

100 parts of Compound (I-4) and 300 parts of water are mixed thoroughly, followed by adjusting the pH value to a range of from 5.5 to 8.5. Through reverse osmosis, the salts are controlled to be less than 0.5 wt %. Subsequently, 2 parts of Compound (II-1) and 20 parts of Demol RN are added thereto, followed by stirring and adjusting the pH value to a range of from 6.0 to 8.5. Finally, the solution is spray dried so as to obtain the reactive printing dye composition of the present embodiment.

Example 4

The reactive printing dye composition of the present embodiment is prepared according to the method described in Example 2, except that Compound (I-3) is replaced by Compound (I-5).

Example 5

The reactive printing dye composition of the present embodiment is prepared according to the method described in Example 2, except that Compound (I-3) is replaced by Compound (I-6).

Example 6

The reactive printing dye composition of the present embodiment is prepared according to the method described in Example 2, except that Compound (I-3) is replaced by Compound (I-7).

Example 7

The reactive printing dye composition of the present embodiment is prepared according to the method described in Example 2, except that Compound (I-3) is replaced by Compound (I-8).

Example 8

The reactive printing dye composition of the present embodiment is prepared according to the method described in Example 2, except that Compound (I-3) is replaced by Compound (I-8).

Example 9

The reactive printing dye composition of the present embodiment is prepared according to the method described in Example 2, except that Compound (I-3) is replaced by Compound (I-10).

Example 10

20 parts of Compound (I-13), 80 parts of Compound (I-14) and 300 parts of water are mixed thoroughly, followed by adjusting the pH value to a range of from 5.5 to 8.5. After purification, 2 parts of Compound (II-1), 10 parts of Demol RN and 30 parts of mirabilite are added thereto, followed by stirring and adjusting the pH value to a range of from 6.0 to 8.5. Finally, the solution is spray dried so as to obtain the reactive printing dye composition of the present embodiment.

Example 11

The reactive printing dye composition of the present embodiment is prepared according to the method described in Example 2, except that Compound (I-3) is replaced by Compound (I-15).

Example 12

The reactive printing dye composition of the present embodiment is prepared according to the method described in Example 2, except that Compound (I-3) is replaced by Compound (I-16).

Example 13

According to the method described in Example 10, 2 parts of Compound (II-1) and 0.2 part of Procexl are added thereto, followed by stirring and adjusting the pH value to a range of from 6.0 to 8.5. Finally, water is added thereto until the solution reaches 100 parts so as to obtain the aqueous reactive printing dye composition.

Example 14

3.2 parts of Compound (I-13), 12.8 parts of Compound (I-14) and 60 parts of water are mixed thoroughly, followed by adjusting the pH value to a range of from 5.5 to 8.5. Through reverse osmosis, the salts are controlled to be less than 0.5 wt %. Subsequently, 2 parts of Compound (II-1), 1 part of Urea and 0.2 part of Procexl are added thereto, followed by stirring and adjusting the pH value to a range of from 6.0 to 8.5. Finally, water is added thereto until the solution reaches 100 parts so as to obtain the aqueous reactive printing dye composition.

Comparative Example 1

100 parts of Compound (I-1) and 100 parts of water are mixed thoroughly, followed by adjusting the pH value to a range of from 5.5 to 8.5. Through reverse osmosis, the salts are controlled to be less than 0.5 wt %. Subsequently, 2 parts of disodium phosphate and 20 parts of Demol RN are added thereto, followed by stirring and adjusting the pH value to a range of from 6.0 to 8.5. Finally, the solution is spray dried so as to obtain a dye composition.

Comparative Example 2

50 parts of Compound (I-13), 50 parts of Compound (I-14) and 300 parts of water are mixed thoroughly, followed by adjusting the pH value to a range of from 5.5 to 8.5. After purification, 2 parts of disodium phosphate, 10 parts of Demol RN and 30 parts of mirabilite are added thereto, followed by stirring and adjusting the pH value to a range of from 6.0 to 8.5. Finally, the solution is spray dried so as to obtain a dye composition.

Comparative Example 3

100 parts of Compound (I-4) and 300 parts of water are mixed thoroughly, followed by adjusting the pH value to a range of from 5.5 to 8.5. Through reverse osmosis, the salts are controlled to be less than 0.5 wt %. Subsequently, 20 parts of Demol RN are added thereto, followed by stirring and adjusting the pH value to a range of from 6.0 to 8.5. Finally, the solution is spray dried so as to obtain a dye composition.

Comparative Example 4

100 parts of Compound (I-4) and 300 parts of water are mixed thoroughly, followed by adjusting the pH value to a range of from 5.5 to 8.5. Through reverse osmosis, the salts are controlled to be less than 0.5 wt %. Subsequently, 2 parts of disodium phosphate and 20 parts of Demol RN are added thereto, followed by stirring and adjusting the pH value to a range of from 6.0 to 8.5. Finally, the solution is spray dried so as to obtain a dye composition.

Comparative Example 5

100 parts of Compound (I-4) and 300 parts of water are mixed thoroughly, followed by adjusting the pH value to a range of from 5.5 to 8.5. Through reverse osmosis, the salts are controlled to be less than 0.5 wt %. Subsequently, 2 parts of N,N-diethylaniline sulfonic acid (DEAS) and 20 parts of Demol RN are added thereto, followed by stirring and adjusting the pH value to a range of from 6.0 to 8.5. Finally, the solution is spray dried so as to obtain a dye composition.

Comparative Example 6

100 parts of Compound (I-4) and 300 parts of water are mixed thoroughly, followed by adjusting the pH value to a range of from 5.5 to 8.5. Through reverse osmosis, the salts are controlled to be less than 0.5 wt %. Subsequently, 2 parts of N-morpholinolpropanesulfonic acid (MOPS) are added thereto, followed by stirring and adjusting the pH value to a range of from 6.0 to 8.5. Finally, the solution is spray dried so as to obtain a dye composition.

Comparative Example 7

50 parts of Compound (I-1), 50 parts of Compound (I-2) and 300 parts of water are mixed thoroughly, followed by adjusting the pH value to a range of from 5.5 to 8.5. Through reverse osmosis, the salts are controlled to be less than 0.5 wt %, and then the pH value is adjusted to a range of from 6.0 to 8.5. Finally, the solution is spray dried so as to obtain a dye composition.

Comparative Example 8

3.2 parts of Compound (I-13), 2.8 parts of Compound (I-14) and 60 parts of water are mixed thoroughly, followed by adjusting the pH value to a range of from 5.5 to 8.5. Through reverse osmosis, the salts are controlled to be less than 0.5 wt %. Subsequently, 0.2 part of Procexl is added thereto, followed by stirring and adjusting the pH value to a range of from 6.0 to 8.5. Finally, the solution is spray dried so as to obtain a dye composition.

Comparative Example 9

The dye composition of the comparative example is prepared according to the method described in Example 13, except that Compound (II-1) is replaced by N,N-diethylaniline sulfonic acid (DEAS).

Comparative Example 10

The dye composition of the comparative example is prepared according to the method described in Example 13, except that Compound (II-1) is replaced by N-(2-hydroxy ethyl)-piperazine ethane sulfonic acid (HEPES).

Comparative Examples 11 to 13

The dye compositions of these comparative examples are prepared according to the method described in Example 14, except that no Compound (II-1) is added thereto in Comparative Example 11, Compound (II-1) is replaced by DEAS in Comparative Example 12, and Compound (II-1) is replaced by HEPES in Comparative Example 13.

Test Results

A. Dye Composition

For the dye compositions according to the above-mentioned Examples and Comparative Examples, after adding 2% of the dye composition according to the present invention and 2% of disodium phosphate (commercially provided), the changes between pH values before and after spray drying at high temperature and then storage are recorded in Table 1. Additionally, the results in the case of adding 0.5% of the dye composition according to the present invention and 0.5% of disodium phosphate (commercially provided) are shown in Table 2.

TABLE 1

Change between pH values before and after spray drying and then storage

| Item | pH value before spray drying | pH value after 60° C. *1W | ΔpH | pH value after 70° C. *1W | ΔpH |
|---|---|---|---|---|---|
| Example 9 | 6.8 | 6.76 | −0.04 | 6.3 | −0.5 |
| Comparative Example 1 | 7.6 | 7.27 | −0.34 | 6.6 | −1.0 |
| Example 10 | 7.0 | 6.3 | −0.7 | 5.63 | −1.37 |
| Comparative Example 2 | 7.6 | 6.87 | −0.73 | 6.09 | −1.51 |

TABLE 2

Change between pH values before and after spray drying and then storage

| Item | pH value before spray drying | pH value after spray drying | ΔpH |
|---|---|---|---|
| Example 3 | 7.0 | 6.6 | −0.4 |
| Comparative Example 3 | 7.0 | 5.2 | −1.8 |
| Comparative Example 4 | 7.3 | 6.7 | −0.6 |
| Comparative Example 5 | 7.0 | 6.6 | −0.4 |

(1) ΔpH means the difference between pH values before and after test.
(2) | ΔpH | is the smaller the better.

B. Screen Printing:

50-100 parts of urea, 10-20 parts of reduction inhibitor agent, 10-30 parts of sodium bicarbonate, 60 parts of sodium alginate or 400-600 parts of thickening agents (containing 4-12% of sodium alginate), and warm water, in a sum of 1000 parts, are mixed to obtain an assisting paste. 3 parts of C.I. Reactive Orange 13 spread in 97 parts of the assisting paste and then rapidly stirred. A twill halftone of 45 degrees and 100 meshes goes over a mercerized cotton twill, on which the color paste is then brushed through a printer. The fabric is then dried in an oven at 100° C. for 5 min. The dried fabric is then steamed with 102-105° C. saturated steam in a steamer at normal pressure for 5-15 mins. Finally, the dyed fabric is washed with cold water, boiling water for 10 mins, boiling non-ionic detergent for 10 mins, and cold water once to twice, and then dried. Alternatively, dry heat fixation also can be used for dyeing.

[Color Test]

Each parameter and relative strength of the above-mentioned dried fabric are measured through ICS GAIN Spectrophotometer, CIE (Commission International del'Eclairage) L*a*b* and CMC 2.00:1 Color Test Systems with D65 standard light source. The results according to the dye compositions of the present invention and Comparative Examples are shown in Table 3, and the dyed fabric provided by using the dye stored in a cold storage is used as a standard.

TABLE 3

Changes between properties before and after spray drying

| Item | Solubility | Printing strength after high temperature storage (70° C.*72 hrs) | Change in relative strength ΔStr |
|---|---|---|---|
| Example 3 | ⊚ | 99.6% | −0.4% |
| Comparative Example 3 | ○-△ | 90.8% | −9.2% |
| Comparative Example 4 | ○-△ | 94.6% | −5.4% |
| Comparative Example 5 | ○-⊚ | 96.2% | −3.8% |
| Comparative Example 6 | ○ | 99.4% | −0.6% |

⊚: excellent solubility (it can be dissolved after adding water and then slightly stirring)
○: good solubility (it can be dissolved after adding water and then stirring)
△: acceptable solubility (its velocity is higher and long time for stirring is required to dissolve it)
ΔStr: difference between strengths before and after the test (the value after minus is the smaller the better since it represents less degradation in strength)

C. Storage Stability Test

The dye compositions according to Examples and Comparative Examples are placed in a weather meter. The temperature is set at 60° C. to observe the changes in each property after storage at high temperature for 1 week. The results are shown in Table 4. Additionally, the temperature is cycled between from −10° C. and 50° C. for 2 months to observe the changes in each property of the dye compositions according to Examples and Comparative Examples.

TABLE 4

Storage stability at high temperature (60° C.*1W)

| Item | Example 13 | Comparative Example 8 | Comparative Example 9 | Comparative Example 10 |
|---|---|---|---|---|
| pH value before test | 7.0 | 7.0 | 7.0 | 7.0 |
| pH value after 60° C.*1 W | 6.6 | 2.5 | 6.2 | 5.6 |
| ΔpH | −0.4 | −4.5 | −0.8 | −1.4 |
| Increased amount of anion (ppm) | +69 | +5035 | +160 | +192 |
| Precipitation | No | Yes | No | No |
| Relative strength (%) | 99.9% | 22.7% | 99.8% | 93.2% |
| ΔStr | −0.1% | −77.3% | −0.2% | −6.8% |

(1) ΔpH: the difference between pH values before and after the test ( | ΔpH | is the smaller the better);
(2) increased amount of anion: the value is the smaller the better (it represents less hydrolysis of reactive groups);
(3) ΔStr: the value after minus is the smaller the better (it represents less degradation in strength).

TABLE 5

Storage stability at high and low temperature (from −10° C. to 50° C.*2M)

| Item | Example 14 | Comparative Example 11 | Comparative Example 12 | Comparative Example 13 |
|---|---|---|---|---|
| pH value before test | 7.0 | 7.0 | 7.0 | 7.0 |
| pH value after −10° C.-50° C.*2 months | 7.0 | 6.7 | 6.6 | 7.3 |
| ΔpH | 0 | −0.3 | −0.4 | +0.3 |
| Increased amount of anion (ppm) | +29 | +74 | +35 | +181 |
| Precipitation | No | No | No | Small particles |
| Relative strength (%) | 100.6% | 99.6% | 98.8% | 95.0% |
| ΔStr | +0.6% | −0.4% | −1.2% | −5.0% |

Although the present invention has been explained in relation to its preferred embodiment, it is to be understood that many other possible modifications and variations can be made without departing from the scope of the invention as hereinafter claimed.

What is claimed is:

1. A reactive printing dye composition for cellulose fiber containing fabric, comprising:

(a) at least one reactive dye in an amount of 70.0 to 97.8 wt %;

(b) an organic buffer which is N-bis(2-hydroxyethyl)-2-aminoethanesulfonic acid or a salt thereof in an amount of 1.3 to 4.0 wt %; and (c) a mirabilite (sodium sulfate) or a dispersant in an amount of 0.1 to 23 wt %, wherein the component (a) is a reactive dye as shown in any one of the following formulas (I-1) to (I-15), its combination or its salt,

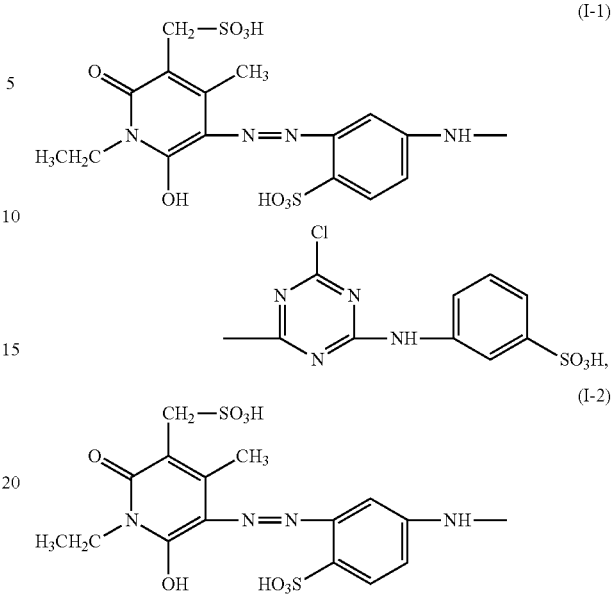

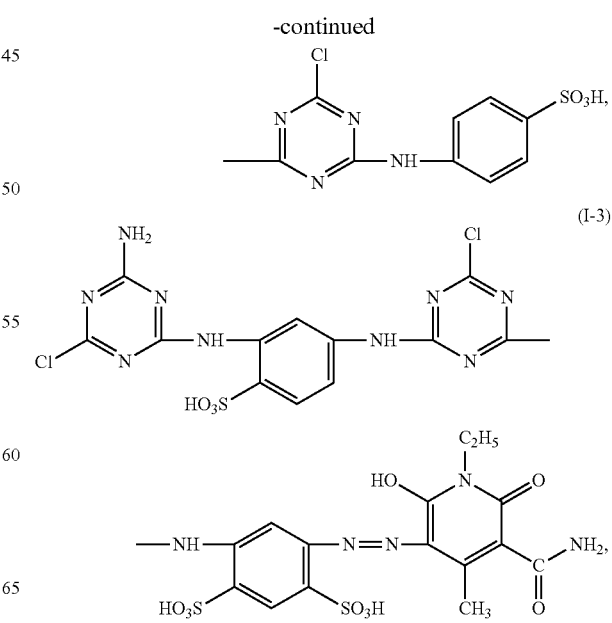

(I-4)
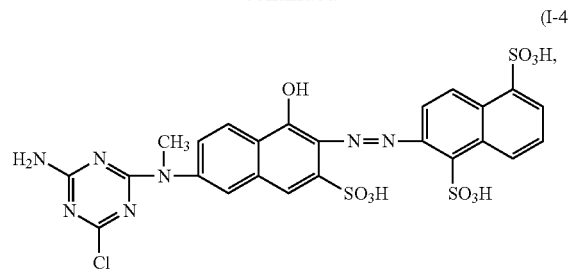
(I-9)
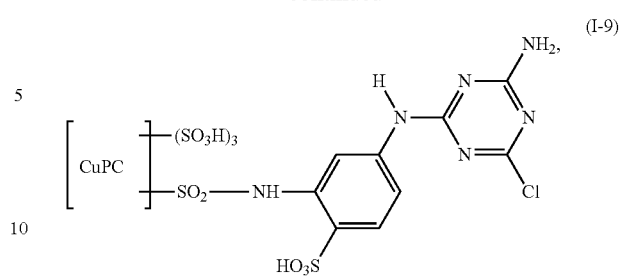
(I-5)
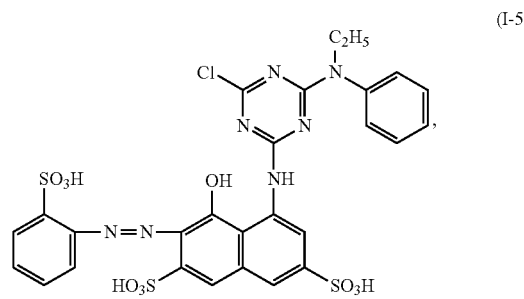
(I-10)
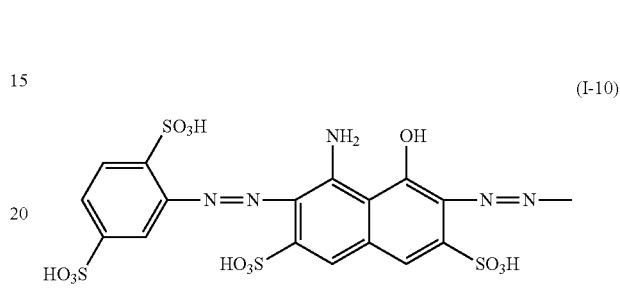
(I-6)
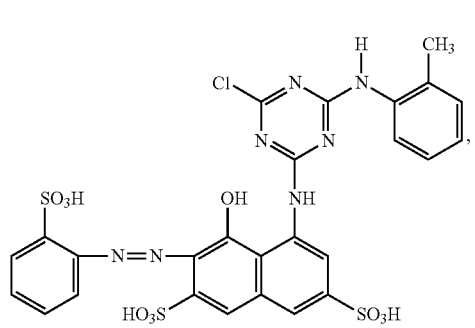
(I-7)
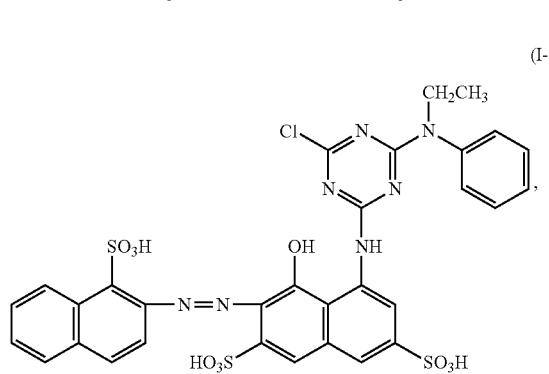
(I-11)
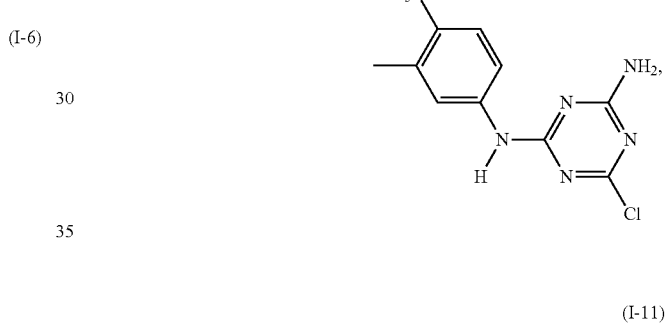
(I-8)
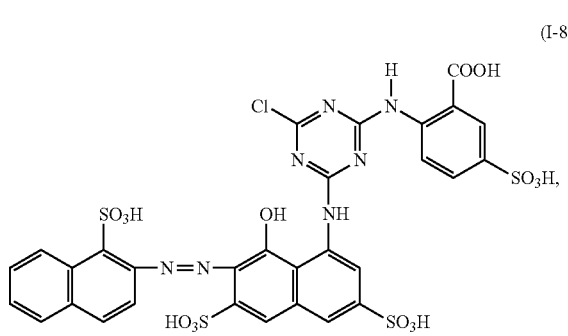
(I-12)
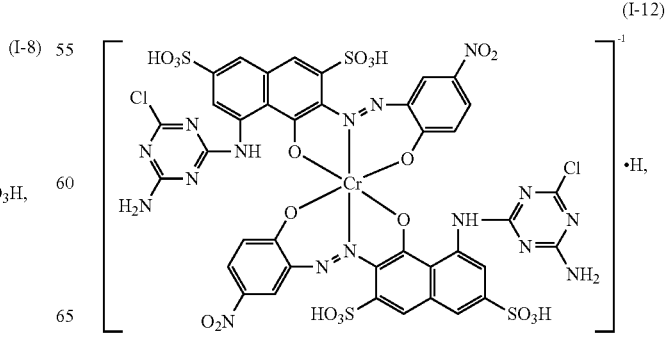

(I-13)
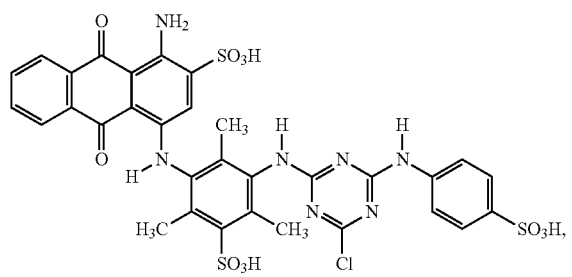
(I-14)
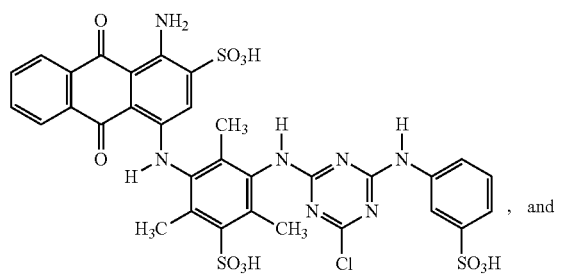
, and
(I-15)
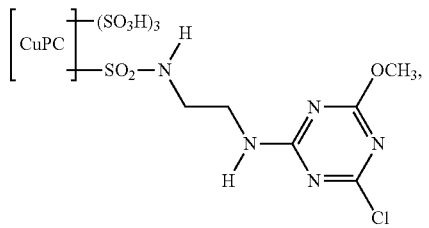
and wherein said dispersant comprises a sodium salt of beta-naphthalene sulfonic acid formaldehyde condensate.
2. The reactive printing dye composition as claimed in claim 1, applied to a cotton twill fabric.
\* \* \* \* \*